Jan. 25, 1949.  C. BELLIOS  2,460,057

MIXER FOR GAS BURNERS

Filed May 17, 1944

INVENTOR.
Constantinos Bellios
BY
ATTORNEY

Patented Jan. 25, 1949

2,460,057

UNITED STATES PATENT OFFICE 2,460,057

MIXER FOR GAS BURNERS

Constantinos Bellios, Brooklyn, N. Y.

Application May 17, 1944, Serial No. 535,926

2 Claims. (Cl. 158—118)

This invention relates to new and useful improvements in gas burners.

It is a conventional construction to provide gas burners with an arrangement for mixing air with the gas in the correct proportion for proper combustion.

This invention particularly relates to an arrangement within the housing of the gas burner and assists in better mixing the air and the gas for superior burning qualities.

The invention proposes numerous improvements embodying the essential features mentioned above.

More specifically, the invention proposes to characterize the new gas burner by a cylindrical housing having an open top formed with a serrated top edge through which a gas-air mixture may pass to form the flames. This housing has its bottom provided with an inlet for the gas and air mixture. A cover is mounted across the open top of the cylindrical housing. One or more baffle blades are mounted within and across the housing for further mixing said gas and air mixture.

This invention specifically proposes a novel way for supporting the baffle blades so that the air and gas mixture passing through the burner causes the blades to rotate and thus indirectly better mixes the air and gas.

Another object of the invention is the construction of a device as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this invention:

Figure 1:
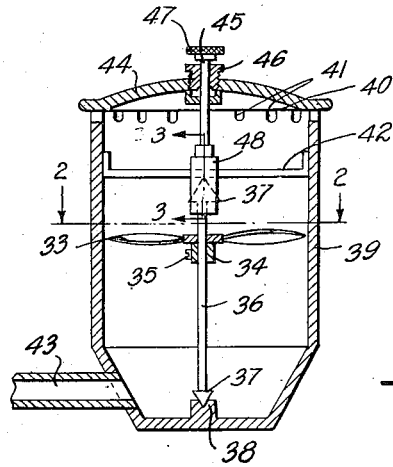
Fig. 1 is a vertical sectional view illustrating a gas burner constructed in accordance with this invention.
Figure 3:
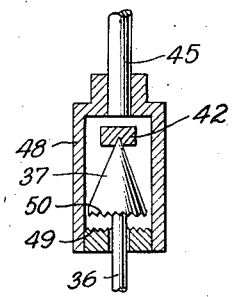
Fig. 3 is a fragmentary enlarged vertical sectional view taken on the line 3—3 of Fig. 1.
Figure 2:
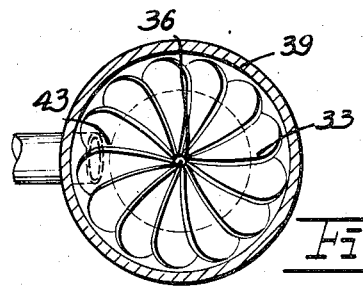
Fig. 2 is a horizontal sectional view taken on the line 2—2 of Fig. 1.

In Figs. 1–3a form of the invention has been disclosed which distinguishes from the known constructions in the fact that the baffle blades 33 are rotatively mounted. More specifically, the baffle blades 33 are secured to a hub which is attached by a set screw 35 to a vertical spindle 36. This spindle has conical ends 37. The bottom end 37 is rotatively mounted in a boss formed in the bottom of the housing 39.

The housing 39 is of cylindrical construction and has an open top 40. The top edge of this open top is formed with serrations 41 through which the gas-air mixture may pass to form the gas flames. A strip 42 is mounted across the sides of the housing 39 spaced inwards from the top edge thereof and forms a support for the top conical end 37 of the spindle 36. The housing 39 is provided with an inlet 43 at its bottom for supplying the gas-air mixture.

A cover 44 is mounted across the open top 40 of the housing 39. This cover is fixed on the housing 39 by soldering, welding, or other ways. A stem 45 passes through the center of the cover 44. A packing gland 46 is mounted on the cover 44 about the stem 45 for preventing leakage of gas. The stem 45 is provided with a knob 47 by which it may be pulled, pushed and turned, as desired. A yoke 48 is mounted upon the bottom of the stem 45 and engages about the support strip 42. The yoke 48 has a serrated portion 49 which in a raised position of the stem 45 engages a complementary serrated portion 50 formed on the bottom face of the top conical end 37.

The operation of this form of the invention is as follows:

The gas-air mixture enters the housing 39 through the inlet 43. It passes up and out through the serrations 41. The motion of the gas-air mixture impinging against the baffle blades 33, causes them to rotate and drive the spindle 36. These rotating baffle blades better mix the air-gas mixture.

Periodically, it is proposed that the knob 47 be pulled upwards to move the stem 45 upwards so as to interengage the serrations 45 and 50. Then the knob 47 should be turned back and forth as permitted by the tolerance of the yoke 48 around the strip 42. In this way it is possible to loosen the spindle 36 to overcome any sticking tendencies. Then the baffle blades 33 are loose and free to turn.

It is to be understood that instead of gas, any other vapor, kerosene, oil, etc., may be used with this arrangement.

While I have illustrated and described the preferred embodiment of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent, is:

1. A gas burner, comprising a cylindrical housing having an open top formed with a serrated top edge through which a gas air mixture may pass to form the gas flames and having at its bottom an inlet for said gas air mixture, a cover mounted across said open top, and one or more baffle blades mounted within and across said housing for further mixing said gas air mixture, said baffle blades being mounted on a spindle having conical ends, a bearing supporting the bottom conical end of said spindle, a strip mounted across said housing and forming a bearing support for the top conical end, a yoke loosely engaging around said strip and having a serrated portion engageable with a serrated portion of said top conical end, a stem supporting said yoke and movable to engage and disengage said serrated portions, and said stem extending through said cover.

2. A gas burner, comprising a cylindrical housing having an open top formed with a serrated top edge through which a gas air mixture may pass to form the gas flames and having at its bottom an inlet for said gas air mixture, a cover mounted across said open top, and one or more baffle blades mounted within and across said housing for further mixing said gas air mixture, said baffle blades being mounted on a spindle having conical ends, a bearing supporting the bottom conical end of said spindle, a strip mounted across said housing and forming a bearing support for the top conical end, a yoke loosely engaging around said strip and having a serrated portion engageable with a serrated portion of said top conical end, a stem supporting said yoke and movable to engage and disengage said serrated portions and said stem extending through said cover, and a packing gland mounted on said cover about said stem.

CONSTANTINOS BELLIOS.

REFERENCES CITED

The following references are of record in the file of this patent:

UNITED STATES PATENTS

| Number | Name | Date |
|---|---|---|
| 823,475 | Machlet | June 12, 1906 |
| 904,772 | Giller | Nov. 24, 1908 |
| 1,014,391 | Hathcock | Jan. 9, 1912 |
| 2,319,721 | Coker | May 18, 1943 |

FOREIGN PATENTS

| Number | Country | Date |
|---|---|---|
| 160,871 | Germany | May 23, 1905 |